M. A. RICHARDSON.
Soldering Process.

No. 169,192.

Patented Oct. 26, 1875.

WITNESSES
Robert Everett
Francis J. Masi

INVENTOR
Milo A. Richardson
Chipman Hosmer & Co
ATTORNEYS

UNITED STATES PATENT OFFICE.

MILO A. RICHARDSON, OF BRIDGEPORT, CONNECTICUT.

IMPROVEMENT IN SOLDERING PROCESSES.

Specification forming part of Letters Patent No. 169,192, dated October 26, 1875; application filed March 6, 1875.

*To all whom it may concern:*

Be it known that I, MILO A. RICHARDSON, of Bridgeport, in the county of Fairfield and State of Connecticut, have invented a new and valuable Improvement in Monuments; and I do hereby declare that the following is a full, clear, and exact description of the construction and operation of the same, reference being had to the annexed drawings, making a part of this specification, and to the letters and figures of reference marked thereon.

Figure 1:
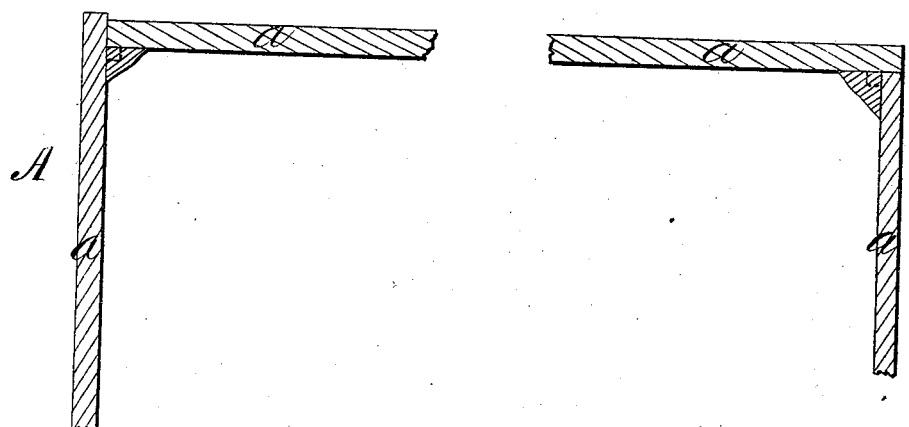
Figure 2:
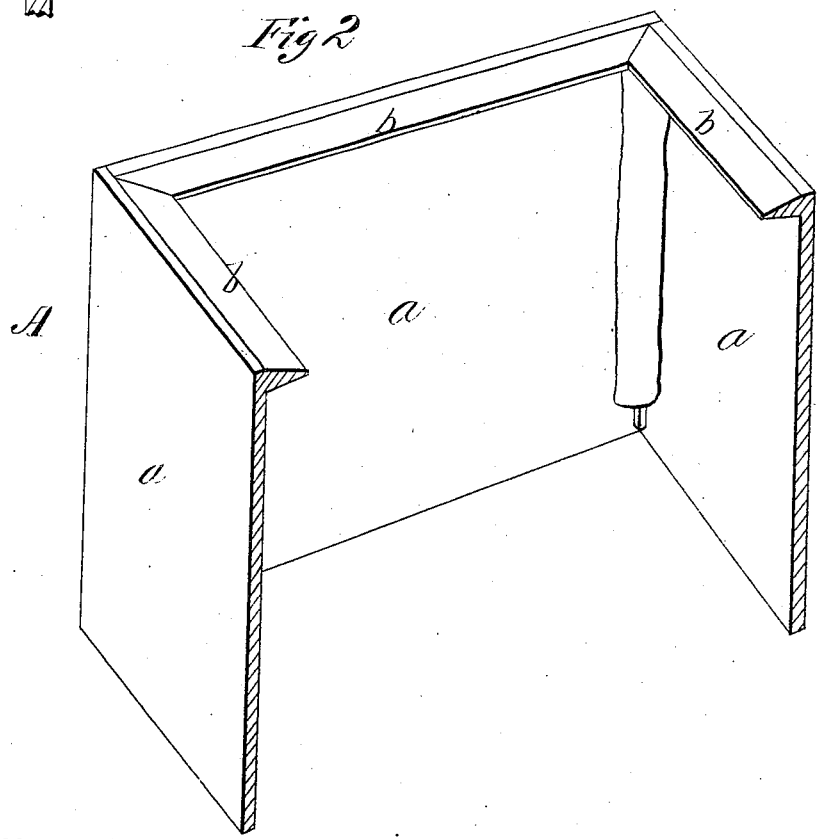

Figure 1 of the drawing is a representation of a sectional view of my device, and Fig. 2 is a perspective view of the same.

This invention has relation to improvements in zinc bases for monuments. To this end the nature of the invention consists in soldering or joining the edges of the sectional plates together by laying a strip of solder in the joint thereof, and then pouring a ladleful of melted zinc upon the said strip, whereby it will be melted, and will be carried along with the zinc in between the said plates, causing them to be rigidly united, and the outer joint of the said plates to present a homogeneous and continuous appearance with the body thereof.

In the annexed drawings, A designates a section of a base of a monument, consisting of sectional plates *a* of zinc, which plates may be of any dimensions, and are provided near their lower edges with an inwardly-projecting flange, *b*, which flanges are adapted to fit into and make a neat joint with each other.

Plates *a* are rigidly secured to each other in the following manner, to wit: Those plates which are designed to be contiguous having been brought together, with their respective edges in close contact, and having been treated with acid, as is usual, a strip of common solder is placed in their angle, and a ladleful of melted zinc is poured thereon, when the solder will be melted by and will flow with the zinc into the crevice between the said plates, completely filling it up with a metal of homogeneous appearance and grain with that of which the plates are made.

In practice the edge of one of the plates will slightly overlap that of the other, so that when they are dressed down flush with each other no joint will be apparent, and the base, though formed of a number of plates, will in all respects appear as though made in a single piece.

Independent of the handsome appearance presented by this close-jointed base, it possesses the following advantages, to wit: Water cannot penetrate through any of its parts into its interior, whereby its foundation-walls would be gradually disintegrated and weakened; it may be cast in separate parts or sections, thus greatly lessening the cost of the base, and increasing the chances of obtaining a perfect casting; and, finally, I am enabled to dispense with soldering-tools in the process of uniting the sections.

It is well known that it is necessary to keep the soldering or coppering iron well tinned, in order to use it on large pieces of work, and that no inconsiderable expense is incurred in keeping it so; but by the above-described process of soldering I dispense with the said tools altogether, and thus save the loss of time, and also the expense incurred in tinning them.

What I claim as new, and desire to secure by Letters Patent, is—

The process of uniting zinc plates, previously treated with an acid, by means of a strip or film of solder placed in the joint of the said plates, and melted by pouring melted zinc upon it, substantially as specified.

In testimony that I claim the above I have hereunto subscribed my name in the presence of two witnesses.

MILO A. RICHARDSON.

Witnesses:
L. L. RICHARDSON,
ELLEN F. FAIRCHILD.